(No Model.) 2 Sheets—Sheet 1.

B. F. CHASE.
Trolling Reel and Cabinet.

No. 230,743. Patented Aug. 3, 1880.

Attest:
F. H. Schott.
Jno. Bowles

Inventor
Benjamin Franklin Chase
per J. C. Tasker atty

N. PETERS, PHOTO-LITHOGRAPHER, WASHINGTON, D. C.

(No Model.)

B. F. CHASE.
Trolling Reel and Cabinet.

No. 230,743. Patented Aug. 3, 1880.

Attest:
F. H. Schott.
Jno. Bowles.

Inventor:
Benjamin Franklin Chase
per J. C. Paskwatty

UNITED STATES PATENT OFFICE.

BENJAMIN F. CHASE, OF CHICAGO, ILLINOIS.

TROLLING REEL AND CABINET.

SPECIFICATION forming part of Letters Patent No. 230,743, dated August 3, 1880.

Application filed April 3, 1880. (No model.)

*To all whom it may concern:*

Be it known that I, BENJAMIN F. CHASE, of Chicago, in the county of Cook and State of Illinois, have invented a new and useful Improvement in Trolling and Fishing Reels and Fishing-Cabinets, and for other purposes, of which the following is a specification.

This invention relates to reels and cabinets for trolling and fishing, and for other purposes. Heretofore persons engaged in trolling and fishing have experienced great annoyance, difficulties, and inconvenience, by reason of the line becoming entangled, and from being unable to know the amount of line out or in.

The object of my invention is to provide a trolling-reel, in connection with mechanism and a fishing-cabinet, which will automatically take up all the slack line, and at the same time designate the amount of line played out or drawn in, and also to provide a convenient cabinet for the holding and safe-keeping at hand, ready for use, of various fishing-tackle and equipments and other articles, and to further provide a mechanism, operating automatically, whereby any slack line, rope, or thread may be taken up.

This invention consists in the arrangement of a reel or drum, a spring, a dial and hand, connected by intermediate mechanism, whereby an automatic movement is transmitted from one to the other; and it also consists in the construction and arrangement of a cabinet with trays and apartments; and it finally consists in the particular construction and arrangement of the several parts.

Figure 1:
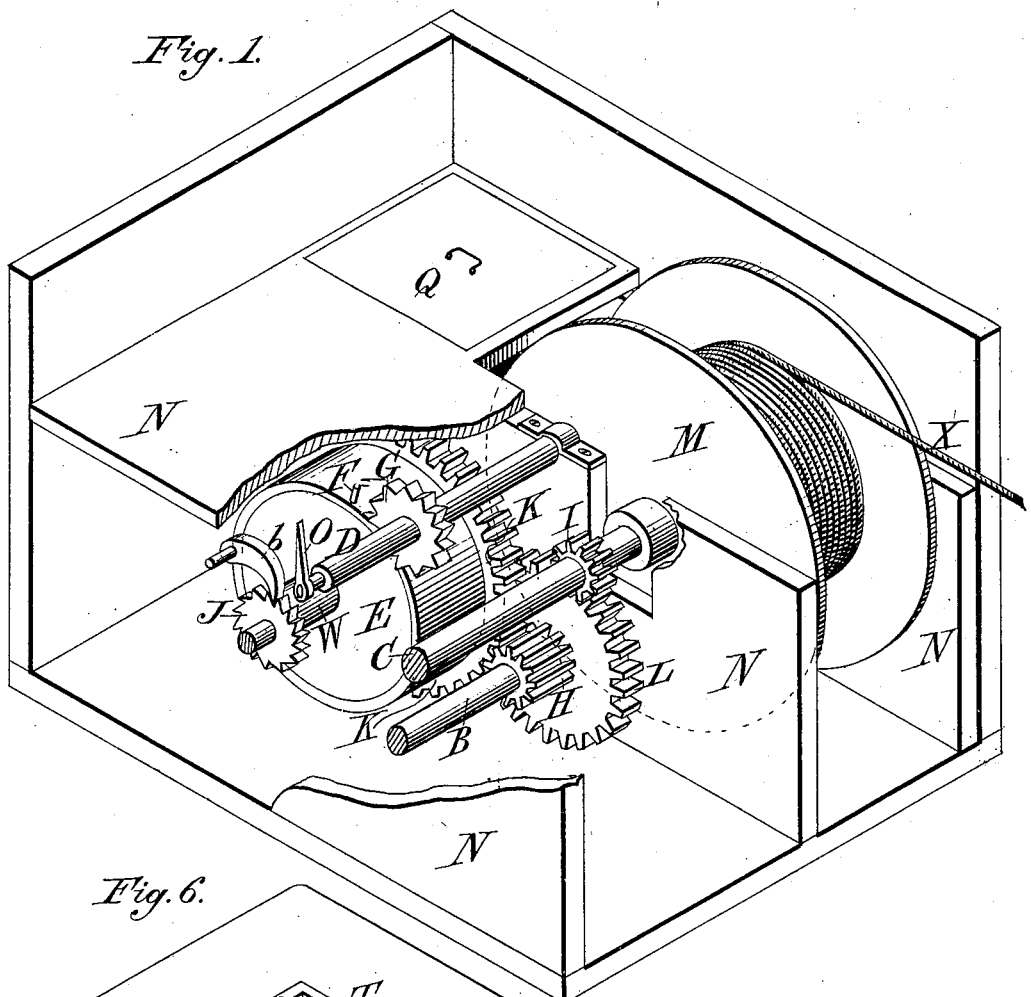
Figure 6:
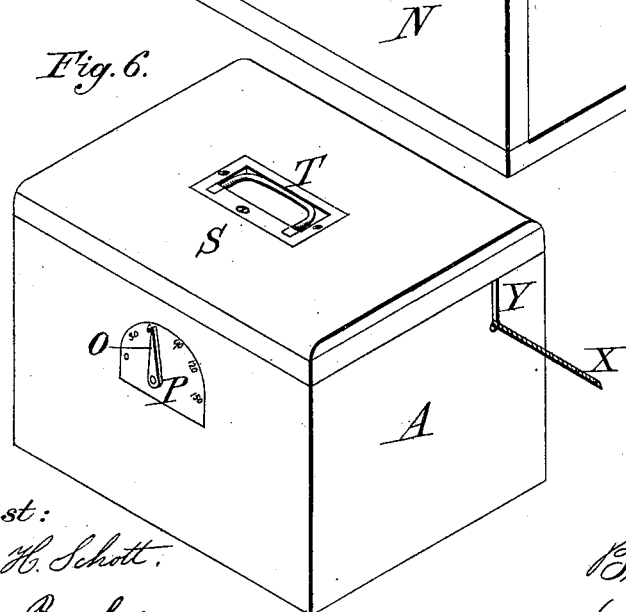
Figure 2:
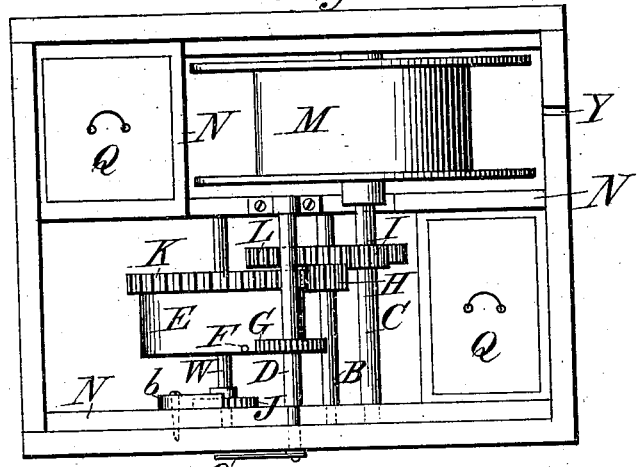
Figure 4:
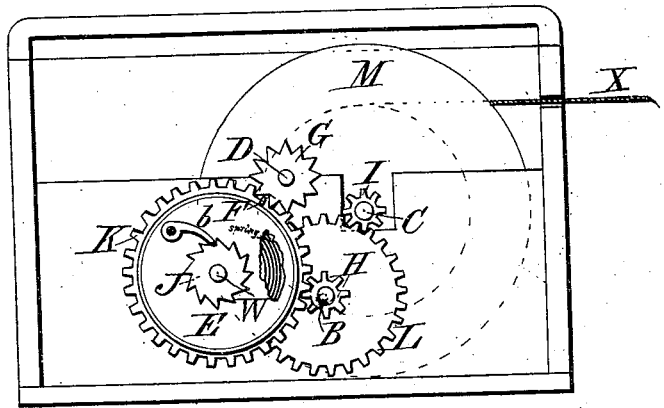
Figure 3:
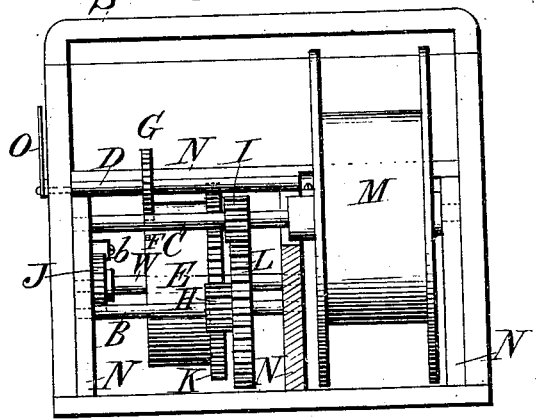
Figure 5:
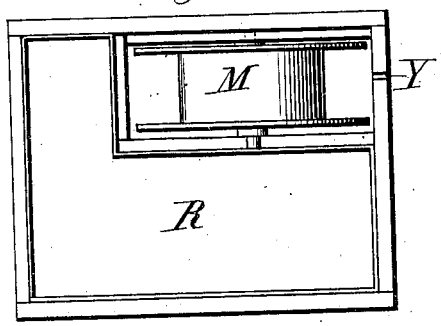

In the accompanying drawings, in which similar letters of reference indicate like parts, Figure 1 is a perspective view embodying my invention. Fig. 2 is a top view of my invention. Fig. 3 is an end view of the same. Fig. 4 is a side view of my invention. Fig. 5 is a top view, showing the tray-apartments. Fig. 6 is a perspective, showing the box closed and the dial and hand.

A is a box, made of any suitable material and in any shape. Its top S is attached by hinges or in any other appropriate manner. It is provided with a handle, T, attached to the top or any part of the box, and is for the purpose of carrying the same. A incases or holds the several parts of the mechanism of my invention.

On one side of the box A is the dial P, with its hand or pointer O, which are connected with and operated by the mechanism within.

M is a reel, spool, or drum, made in any appropriate way. It is attached firmly upon the shaft C and revolves therewith. Upon M the line X is wound.

C is a shaft serving as an axle for M. I is a gear or pinion firmly attached to C and revolving therewith. It works into the gear or cog-wheel L upon the shaft B.

L is a gear or cog-wheel, firmly attached to shaft B and revolving therewith. It connects or works with the gear I.

B is a revolving shaft, provided with the cog-wheel L and pinion H, firmly attached thereto.

H is a pinion upon the shaft B, and firmly attached thereto and revolving therewith. It operates or connects with the gear or wheel K.

W is a stationary and revolving shaft, upon which is a ratchet, J, firmly attached thereto, and operating, in connection with the pawl *b*, to hold the shaft W firm and stationary. The shaft W remains stationary when the other mechanism is in operation. The turning or revolving of the shaft W operates, independently of the other mechanism, to wind the spring. When so used W is a substitute for the reel M in winding the spring; and for that purpose the end of the shaft W may be extended through the casing and worked or turned by a crank or key.

E is a barrel containing a coil-spring, such as used in clocks, &c. The spring is attached to the barrel and also to the shaft W. The barrel E is hung on the shaft W and revolves independently therefrom.

To the side of the barrel E is firmly attached a cog-wheel, K, which revolves with it, and, in connection with H, operates the other mechanism.

Upon the barrel E are posts or pegs F, any number desired. These, in connection with gear G, regulate and operate the dial mechanism. Instead of the posts or pegs a gear attachment may be used.

D is a revolving shaft, operated or revolved by the action of the posts F upon the gear G.

Upon this shaft is a gear, G, firmly attached thereto and revolving therewith, and operating in connection with pegs or posts F.

The shaft D at its outer end is connected with hand O or dial P, and operates either, as may be desired. If connected to one the other is disconnected and stationary.

P is a stationary or revolving dial, upon which are numbers to designate the amount of line out or in.

O is a stationary or revolving hand or pointer.

P and O, if stationary, are not attached to D, but, independently, to the box or casing. When not in use P and O can be detached and placed in the tray inside of the box until again needed. The dial may be marked or painted on the box A.

Q Q are boxes set in the inside of the box A, free from the mechanism, and extend from the bottom of A up to the bottom of the tray. They are used for holding fishing-tackle and other articles. These boxes may be any number.

R is a removable tray resting upon the boxes Q Q, and occupying all the space at the top of the box not taken up by the reel M. It is used for holding fishing-tackle and various articles, and may be divided into as many compartments as desired.

Y is a slot or hole in the side of the box A, through which the line runs.

The several parts of mechanism are held in position by appropriate frame-work, so as to permit their free operation.

The working and operation of my invention is as follows: In order to attach to or wind the line upon the reel, so as to be ready for work, the reel M is turned in the direction in which the line is paid out. This will turn the shaft C and pinion I, and I, in connection with the gear L, turns the shaft B and pinion H, which operates the cog-wheel K, making the barrel E revolve, and thereby winding the spring. The reel is made to revolve until the spring is wound up as much as is desired. The line is then attached to the reel M, when the spring will automatically unwind, thereby revolving the wheel K, shaft B, pinion H, wheel L, pinion I, shaft C, and reel M, whereby the line is wound or taken up. The machine is now ready for use. The line is gradually played out, and in so doing revolves the reel M, this revolution, operating through the intermediate mechanism, winds up the spring, as before described. The spring thus having been wound up, as the line is hauled or pulled in the slack line will be instantly and automatically taken up and wound upon the reel by the revolution thereof, and this taking up of the slack line and winding up of the spring will continue to go on automatically until the line out, is pulled in.

At the time and when the line is being played out or pulled in the amount of the line in or out will be designated upon the dial, the dial being operated automatically by the pegs F, revolving with E, and operating upon the wheel G, so as to revolve the shaft D. During all this time the shaft W is stationary.

If it is desired to wind up the spring without the labor of turning the reel so many times the shaft W may be turned by means of a crank or key, and the line thereby wound up, thus, by simply turning the shaft W and winding the spring an unlimited number of feet of line can be wound upon the reel. In case it is desired, the ordinary clock-weight attachment may be used in place of the spring, the other mechanism remaining substantially the same.

The boxes and trays can be inserted or removed at pleasure, and are for holding any articles desired. The hand and dial can be detached and placed inside of the box. The box or cabinet is then closed and carried to the place desired.

I do not wish to be considered as confining my invention simply for taking up the slack line in fishing; but it may be used to take up any and all slack line, rope, or thread by means of the mechanism described.

Having described my invention, what I claim as new, and desire to secure by Letters Patent, is—

1. In a fishing-cabinet, a removable dial and pointer, in combination with a spring connected with a reel by intermediate mechanism, whereby the amount of line out or in is designated, substantially as described and set forth.

2. In a fishing-cabinet, the combination of the reel or spool M, having shaft C, carrying gear I, with the gears H L on the shaft B, spring-barrel E, provided with gear K and pegs F, and the shaft D, having gear G and indicator O, all constructed and arranged substantially as and for the purpose described.

3. In a fishing-cabinet, the box A, provided with hinged top S, handle T, slot Y, dial P, boxes Q Q, and tray R, in combination with the spring-barrel E, reel M, line X, and their connecting and operating mechanism, all constructed and arranged as and for the purpose specified.

BENJAMIN FRANKLIN CHASE.

Witnesses:
H. L. BLAKESLEE,
CHAS. A. CHASE.